US007987917B1

(12) United States Patent
Kornecki

(10) Patent No.: US 7,987,917 B1
(45) Date of Patent: Aug. 2, 2011

(54) MULTISTAGE CROP ROLLER

(75) Inventor: Ted S. Kornecki, Auburn, AL (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 12/170,265

(22) Filed: Jul. 9, 2008

(51) Int. Cl.
*A01B 21/02* (2006.01)

(52) U.S. Cl. .............................. 172/554; 172/184; 56/52

(58) Field of Classification Search .................. 172/184, 172/187, 195, 518, 520, 523, 537, 540, 551, 172/554, 539; 56/52, 53, 500–505
See application file for complete search history.

(56) References Cited

U.S. PATENT DOCUMENTS

| | | | | | |
|---|---|---|---|---|---|
| 127,623 | A | * | 6/1872 | Martin | 172/552 |
| 492,399 | A | * | 2/1893 | Heldebrant | 172/184 |
| 704,897 | A | * | 7/1902 | May | 172/184 |
| 1,088,075 | A | * | 2/1914 | Johnson | 172/640 |
| 1,179,388 | A | * | 4/1916 | Ariens | 172/184 |
| 1,202,703 | A | * | 10/1916 | Gladney | 172/551 |
| 1,315,918 | A | * | 9/1919 | Finseth | 172/547 |
| 1,490,222 | A | * | 4/1924 | Martin | 172/551 |
| 1,544,632 | A | * | 7/1925 | Branson | 172/500 |
| 2,066,610 | A | * | 1/1937 | Carlin | 111/14 |
| 2,553,356 | A | * | 5/1951 | Cady | 172/514 |
| 2,791,955 | A | * | 5/1957 | Wilson | 172/540 |
| 2,871,956 | A | * | 2/1959 | Boyd-Brent | 172/72 |
| 3,062,300 | A | * | 11/1962 | Bullard | 172/21 |
| 3,437,061 | A | * | 4/1969 | Wells | 111/138 |
| 3,610,185 | A | * | 10/1971 | Scarborough | 111/61 |
| 3,941,193 | A | * | 3/1976 | Shoemaker | 172/106 |

(Continued)

FOREIGN PATENT DOCUMENTS

GB 2117212 A * 10/1983

OTHER PUBLICATIONS

Introduction to Cover Crop Rolling & the VA-USDA Crimper Roller Demonstration Project, Sep. 2006, pp. 1-6, http://www.shenandoahrcd.org/ProjNoTilIVA.Roller.FS.Sept.06.III.pdf.*

(Continued)

*Primary Examiner* — Robert E Pezzuto
*Assistant Examiner* — Jamie L McGowan
(74) *Attorney, Agent, or Firm* — John D. Fado; Robert D. Jones

(57) ABSTRACT

The multi-stage crop termination system includes a main frame assembly connected to first and second roller frames. A first roller is installed in the first roller frame and a second roller is installed in the second roller frame. A compression frame extends between the main frame and the second roller frame so that a downwardly compression force is applied to the second roller. In the preferred embodiment, the first roller is a smooth drum and the second roller is a central cylindrical drum with a plurality of crimping bars extending outwardly from the drum. In operation, crops are flattened by the first roller and then crimped by the second roller. A pivot joint between the first roller frame and the second roller frame ensures that the second roller is able to maintain contact with the ground as the system traverses uneven terrain.

19 Claims, 4 Drawing Sheets

U.S. PATENT DOCUMENTS

| | | | |
|---|---|---|---|
| 4,088,083 A * | 5/1978 | Dail et al. | 111/13 |
| 4,193,457 A * | 3/1980 | Sphar | 172/810 |
| 4,195,883 A * | 4/1980 | Ronnhult et al. | 297/303.4 |
| 4,690,224 A * | 9/1987 | Shwez | 172/45 |
| 5,509,488 A * | 4/1996 | Merilainen | 172/63 |
| 5,953,895 A * | 9/1999 | Hobbs | 56/500 |
| 6,539,697 B2 * | 4/2003 | Burk | 56/504 |
| 6,968,907 B1 * | 11/2005 | Raper et al. | 172/518 |

OTHER PUBLICATIONS

Raper, R.L. et al., "Reducing Vibration While Maintaining Efficacy of Rollers to Terminate Cover Crops," Applied Engineering in Agriculture, 2004, vol. 20, No. 5, pp. 581-584.

Kornecki, T.S. et al., "Performance of Different Roller Designs in Terminating Rye Cover Crop and Reducing Vibration," Applied Engineering in Agriculture, 2006, vol. 22, No. 5, pp. 633-641.

* cited by examiner

MULTISTAGE CROP ROLLER

The present invention relates to a system and method for mechanically terminating cover crops. Specifically, the current invention relates to a multi-stage roller assembly designed to roll over and crimp crops.

BACKGROUND OF THE INVENTION

Cover crops are an important part of most no-till conservation systems, but they must to be managed correctly to fully realize their potential benefits. Among other things, these benefits include a reduction in soil erosion and the suppression of weed pressure. For example, in southern portions of the US, rye (Secale Cereale. L.) is commonly used as a winter cover crop. Rye improves soil properties and releases chemicals that suppress weeds. Rye also reduces soil compaction, facilitates water and air infiltration, and increases soil organic matter content.

At the end of a selected cover crop growing cycle, the cover crops are terminated so that a cash crop can emerge and thrive. Termination of the cover crop allows the cash crops to fully benefit from the soil conditioning properties of the terminated cover crops without competing with the cover crops for water and nutrients.

In the past, herbicides were the preferred means of terminating cover crops, primarily because the herbicide application process is relatively fast and effective. Although herbicide application effectively kills the cover crops, there may be problems associated with unintended over-spray, spray drift, and undesirable chemical run-off. The herbicides also leave the cover crop stalks in tact. The stalks and associated crop residue subsequently interfere with the cash crop planting process, particularly for cover crops (such as rye) that generate a large amount of biomass. As a result, frequent stops are required to clean accumulated cover crop residue from planting units. In addition, cover crop biomass often causes hair-pinning, a condition in which crop residue prevents adequate seed-soil contact.

Rolling and crimping devices have been developed to destroy and mulch the cover crops and thereby address these issues. However, operators of the crimping devices frequently complain of the excessive vibrations associated with the devices. The excessive vibrations commonly result in an increased heart rate, headache, stomach pain, and lower back pain. Prolonged exposure to these types of excessive vibrations may lead to spinal degeneration. Although the severity of the vibrations can be reduced by simply reducing operating speed, this is generally regarded as an economically impractical solution, particularly in view of the relatively higher operating speeds achievable using herbicide-oriented methods.

Several vibration-mitigating roller systems have been developed to address vibration problems, but these devices are primarily directed to large-scale operators with powerful and versatile tractors. Smaller farming operations (especially vegetable farms) cannot use the large-scale rollers because their tractors are generally smaller and lack the power and capability required to operate the larger and heavier rollers.

The need exists for a roller/crimper system compatible with smaller scale operations that effectively destroys and mulches crops without transmitting excessive vibrations to the operator. The current invention provides a two-stage roller that effectively destroys cover crops, reduces detrimental vibrations, and is compatible with the power constraints of tractors common in smaller, lower income farming operations.

SUMMARY OF THE INVENTION

The current invention is directed to a multi-stage crop termination system. The system includes a main frame assembly connected to first and second roller frames. A first roller is installed in the first roller frame and a second roller is installed in the second roller frame. A compression frame extends between the main frame and the second roller frame so that a downwardly compression force is applied to the second roller.

In the preferred embodiment, the first roller is a smooth drum and the second roller is a central cylindrical drum with a plurality of crimping bars extending outwardly from the drum. In operation, crops are flattened by the first roller and then crimped by the second roller. A pivot joint between the first roller frame and the second roller frame suppresses the transmission of vibrations from the second roller frame and ensures that the second roller is able to maintain contact with the ground as the system traverses uneven terrain.

DETAILED DESCRIPTION OF PREFERRED EMBODIMENTS

Figure 1:
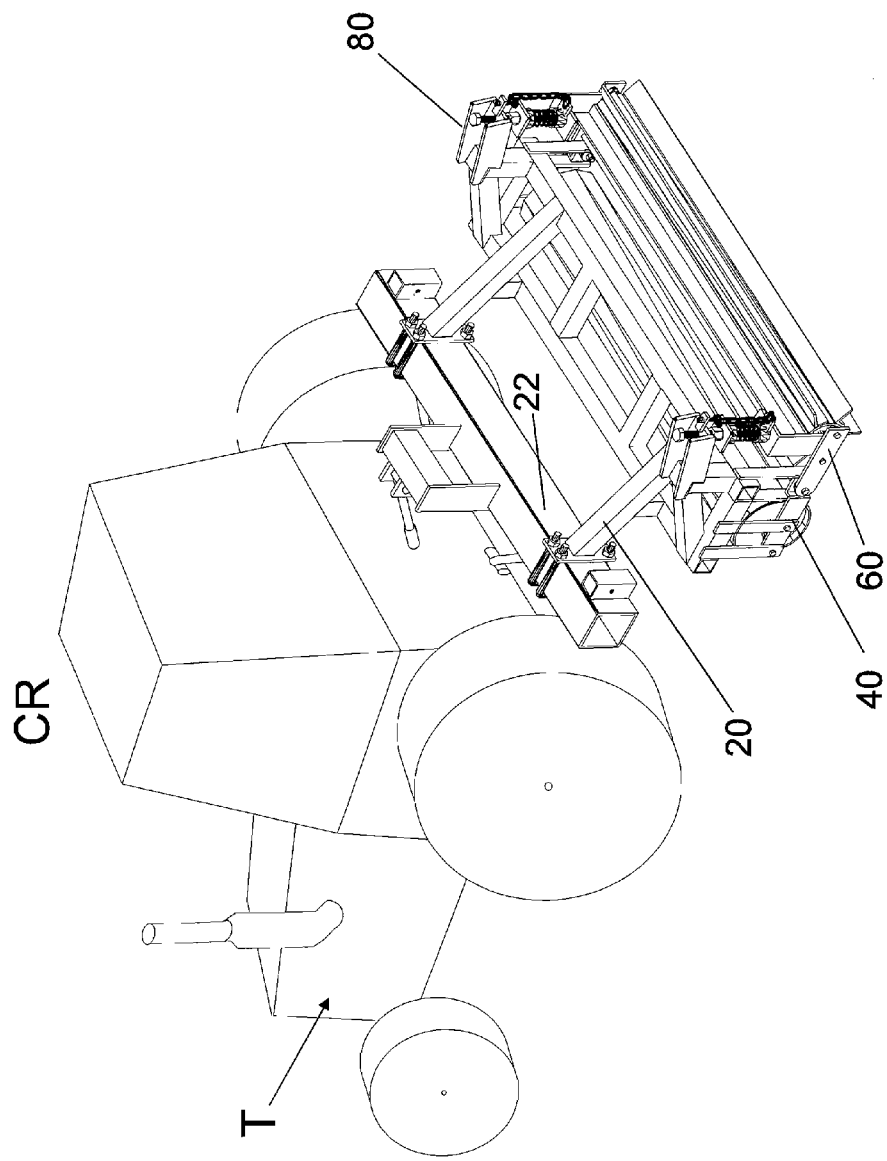
FIG. 1 is an environmental rear perspective view current invention.

The multistage crop roller CR of current invention is generally shown in FIG. 1. In the preferred embodiment, the crop roller CR comprises a two roller-stage system that is towed across a field by a tractor T. In alternative embodiments, the crop roller CR may be self-propelled or may be propelled by any means known in the art and may include multiple additional roller stages.

As generally shown in FIG. 1, the multistage crop roller CR comprises a main frame 20, a first roller frame assembly 40, a second roller frame assembly 60, and a compression roller frame assembly 80. In the preferred embodiment, the crop roller CR is connected to the tractor T via the tool bar 22.

Figure 2:
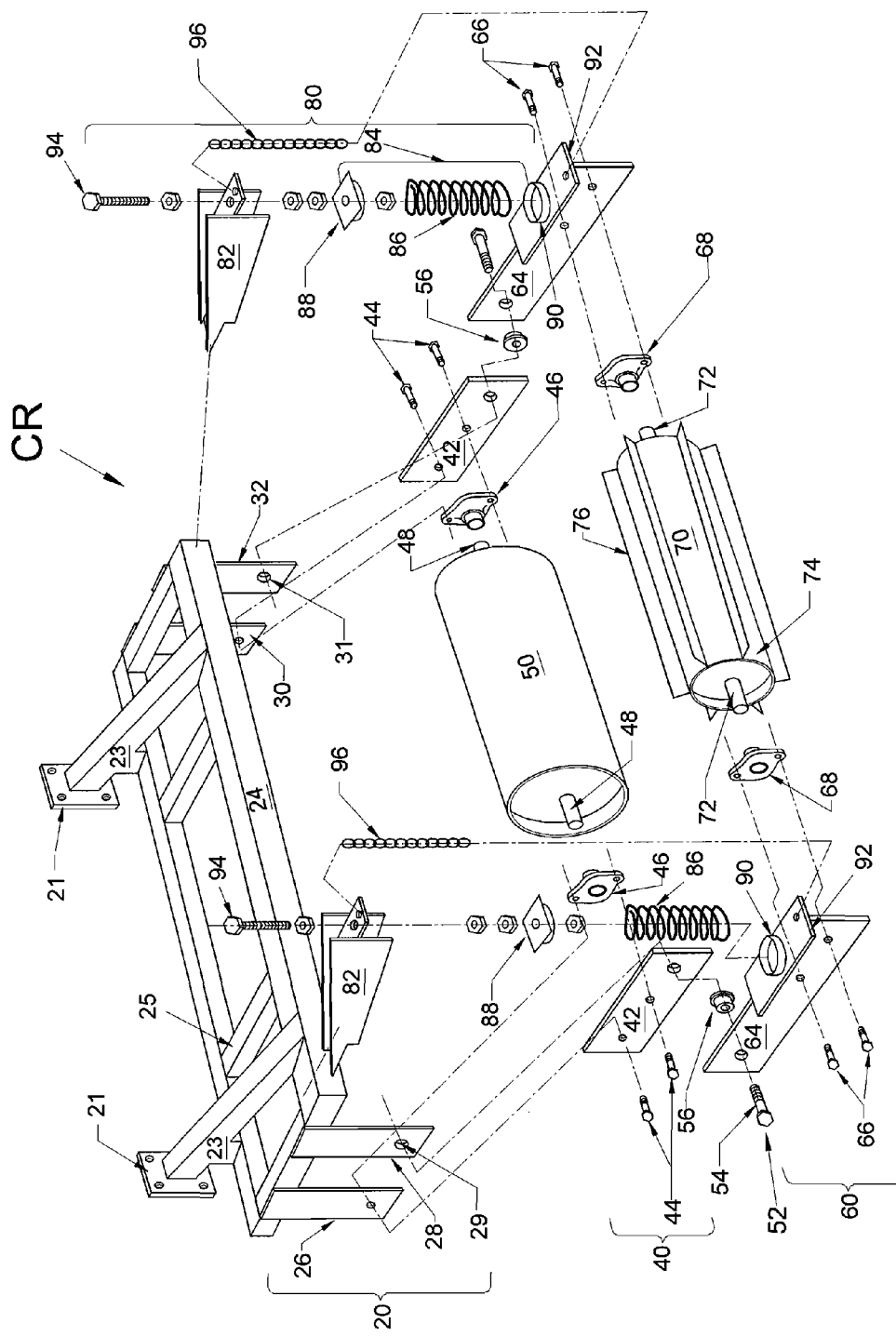
FIG. 2 is an exploded view

FIG. 2 shows the preferred embodiment of the multistage crop roller CR. The crop roller CR main frame 20 comprises a rectangular structural frame 24 with horizontally extending supporting members 25. Angular supports 23 extend upwardly from the rectangular frame 24 and terminate in a flange plate 21. The flange plate 21 is adapted to bolt to a tool bar 22 as shown in FIG. 1. However, in alternative embodiments, the main frame 20 may be connected to the tractor T by any means known in the art.

As shown in FIG. 2, a first pair of end plates 26, 28 extend downwardly from the first end of the rectangular frame 24, and a second pair of end plates 30, 32 extend from the opposing end of the rectangular structural frame 24. The end plates 26, 30 connect the rectangular frame 24 with the first roller frame assembly 40. The end plates 28, 32 connect the rectangular frame 24 with a pivot joint mechanism 52 between the first roller frame assembly 40 and the second roller frame assembly 60.

As shown in FIG. 2, the first roller frame assembly 40 is primarily comprised of opposing first base plates 42 which form a mounting base for the first roller 50. A pair of bearing connectors 44 extends through each of the first base plates 42 and secures a flange bearing 46 to each of the respective base plates 42. The flange bearings 46 engage each end of a first roller axle 48 and thereby connect the first roller 50 with the first roller frame assembly 40.

In the preferred embodiment, the first roller 50 is essentially a smooth cylindrical drum with a 12 inch diameter and a length of between 60 and 72 inches. The first roller 50 may be of unitary construction or it may be comprised of multiple segments formed as a cylinder.

As shown in FIG. 2, the second roller frame assembly 60 has a generally similar configuration as the first roller frame assembly 40. Specifically, the second roller frame assembly is primarily comprised of opposing second base plates 64 which form a mounting base for the second roller 70. A pair of bearing connectors 66 extend through each of the second base plates 64 and secures a flange bearing 68 to each of the respective base plates 64. The flange bearings 68 engage each end of a second roller axle 72 and thereby connect the second roller 70 with the second roller frame assembly 60.

In the preferred embodiment, the second roller 70 is between 60 and 72 inches in length and is comprised of a central drum 74 with linear evenly spaced crimping bars 76 extending normal to the drum 74. In alternative embodiments the crimping bars may not extend normal to the drum 74, and may be non-linear and/or irregularly spaced. For example, in one alternative embodiment, the crimping bars 76 may be regularly spaced but angular and slightly curved and may extend diagonally relative to the drum 74. In further embodiments, the pattern, angle, and general placement of the crimping bars 76 relative to the central drum 74 may include any configuration known in the art.

Figure 3:
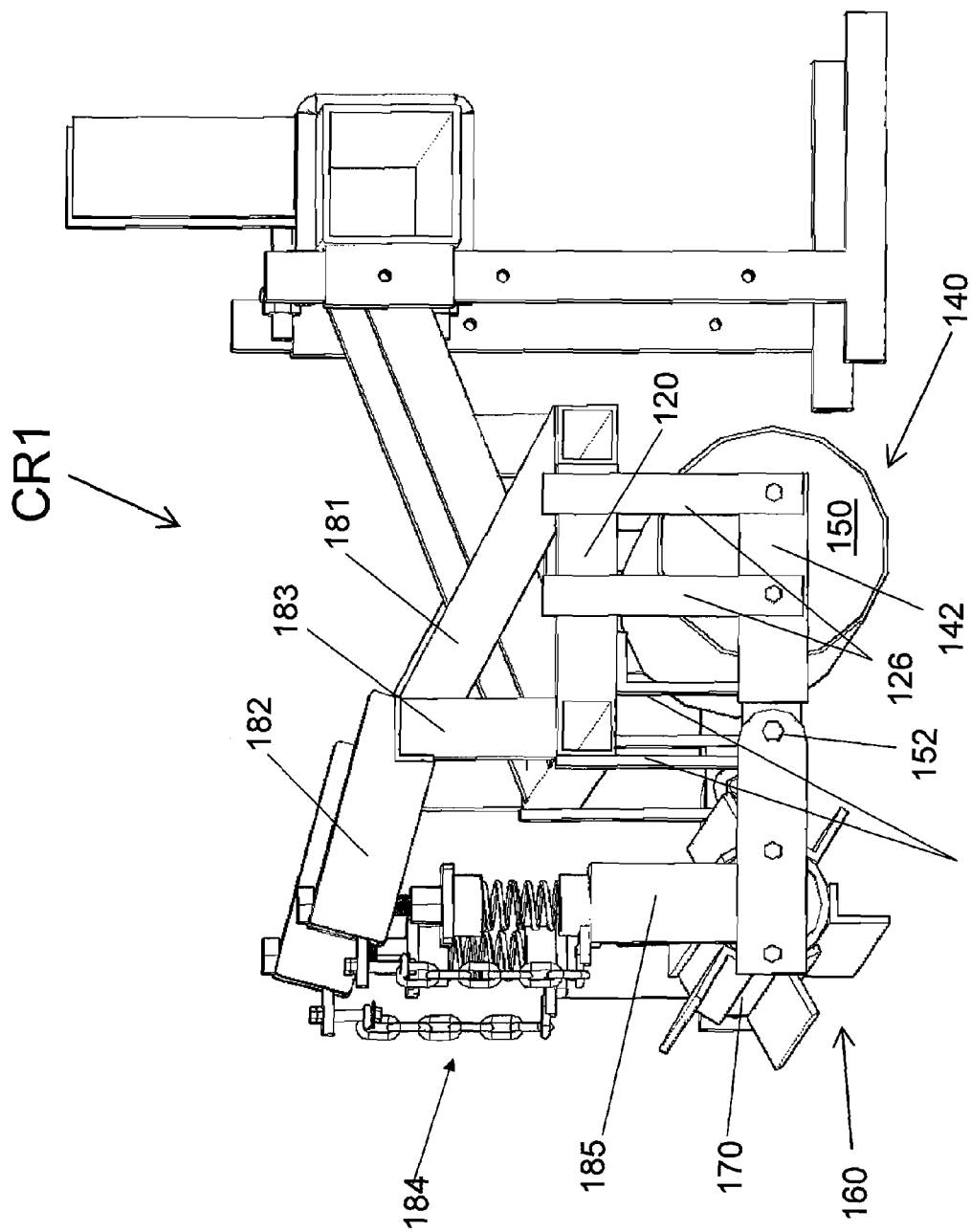
FIG. 3 is a side perspective view of an alternative embodiment.

As shown in FIGS. 2 and 3, the first roller assembly 40 is joined to the second roller assembly 60 via a pivot joint mechanism 52 disposed on each side of the crop roller CR. The pivot joint mechanism 52 is comprised of a frame assembly connection pin 54 that extends through the first base plate 42, the second base plate 64, and an aperture 29, 31 in the lower ends of the respective end plates 28, 32. The connection pin 54 also extends through a rubber vibration isolator 56 positioned between the first 42 and second 64 base plates. The isolator 56 helps suppress the transmission of vibrations from the second roller frame assembly 60 to the first roller frame assembly 40.

As shown in FIG. 2, the current invention includes a compression frame assembly 80. The compression frame assembly 80 provides a means of applying a compressive downwardly force on the second roller 70 via the second roller frame 60. The downward force applied by the compression frame 80 enhances the effectiveness of the second roller 70.

The upper portion of the compression frame assembly 80 includes extension arms 82 that extend rearwardly from the rectangular structural frame 24. The extension arms 82 may be affixed to the rectangular frame 24 by any means known in the art. The compression force is specifically applied by an adjustable spring mechanisms 84 positioned respectively on each side of the roller 70 and disposed generally between the extension arms 82 and the second roller frame 60. In the preferred embodiment, the adjustable spring mechanism 84 has a shock-absorber type configuration. However, in alternative embodiments, the downwardly force may be applied by any means known in the art.

As shown in FIGS. 2 and 3, the adjustable spring mechanisms 84 are comprised of a spring element 86 nested between an upper spring plate 88 and a lower spring plate 90. Each of the lower spring plates 90 is supported by a horizontal support plate 92 which in turn rests on an upper surface of the respective second base plates 64.

The compressive force exerted by the spring mechanisms 84 is controlled by adjusting the position of the respective compression adjustment bolts 94. The compression adjustment bolts 94 extend through the respective extension arms 82 and engage the upper spring plates 88. As the compression adjustment bolts 94 are tightened and the upper spring plates 88 are forced downwardly, the spring mechanisms 84 are compressed and a downwardly force is applied to second roller 70 via the base plates 64. In other words, adjusting the position of the compression adjustment bolts 94 downwardly increases the compressive force exerted by the spring mechanisms 84 on the second roller 70.

The compression assembly 80 also includes a pair of restrictor chains 96. As shown in FIGS. 2 and 3, the restrictor chains 96 extend from each of the respective extension arms 82 to the horizontal support plates 92. The restrictor chains 96 limit the downwardly travel of the second roller 70 so that the second roller 70 does not continue to pivot downwardly when the tractor T raises the crop roller CR at the end of the rolling and crimping process.

Figure 4:
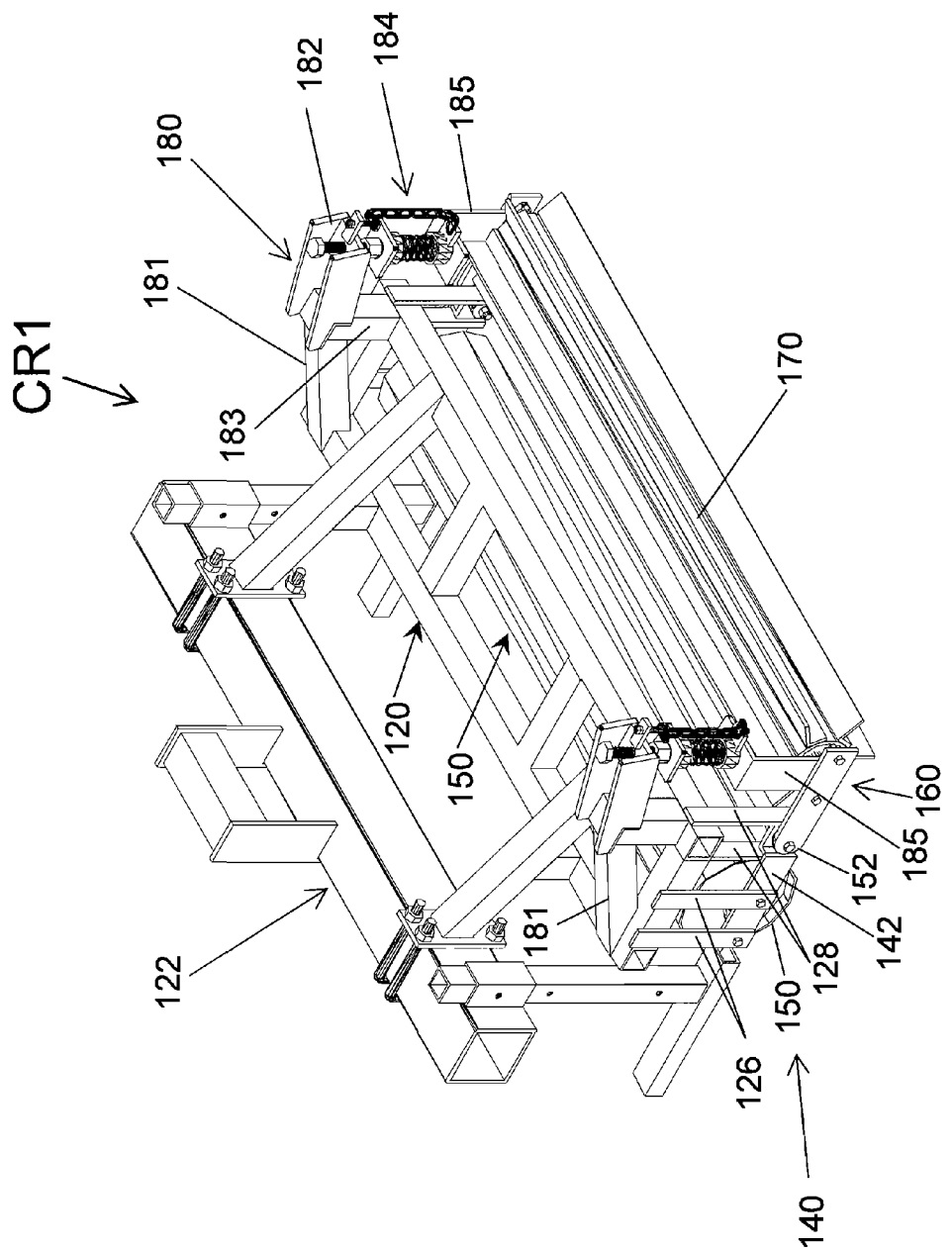
FIG. 4 is a rear perspective view of the alternative embodiment shown in FIG. 3.

FIGS. 3 and 4 show an alternative embodiment CR1 of the current invention that has a heavier and more robust structure. In the alternative embodiment, end plates 126 extend downwardly from the main frame 120 to the first base plate 142 positioned adjacent the first roller 150. Additional vertical braces 128 provide further structural support to the first 140 and second 160 frame assemblies. The first frame assembly 140 pivots with the second frame assembly 160 at the modified pivot joint 152.

As further shown in FIGS. 3 and 4, in the alternative embodiment, the extension arms 182 are elevated relative to the main frame 120 via diagonal 181 and vertical 183 bracing members. Added vertical support members 185 elevate the compression spring assemblies 184 and extend the respective spring assemblies 184 over the end portions of the second roller 170 so that the spring assemblies 184 are vertically aligned with the axle of the second roller.

For the foregoing reasons, it is clear that the preferred embodiment and associated alternative embodiments of the current invention provide an innovative two stage crop crimping and roller system. The invention may be modified in multiple ways and applied in various technological applications. The current invention may be customized as required by a specific operation or application, and the individual components may be modified and defined, as required, to achieve the desired result. Although the materials of construction are not described, they may include a variety of compositions consistent with the function of the invention. Such variations are not to be regarded as a departure from the spirit and scope of the invention, and all such modifications as would be obvious to one skilled in the art are intended to be included within the scope of the following claims.

What is claimed is:

1. A multi-stage crop roller system, the system comprising:
   a main frame assembly;
   a first crop roller frame connected to the main frame assembly;
   a first crop roller connected to the first roller frame;
   a second crop roller frame connected to the first crop roller frame;
   a second crop roller connected to the second crop roller frame, the second crop roller comprising a plurality of crimping bars, and;

a compression frame extending between the main frame assembly and the second crop roller frame, the compression frame exerting a downwardly force on the second crop roller via the second crop roller frame;

wherein as a motive means urges the system forward, the first and the second crop rollers roll over and crimp crops and thereby effectively terminate the crops.

2. The system of claim 1 wherein the first crop roller comprises a smooth cylindrical drum.

3. The system of claim 1 wherein the crimping bars are linear and evenly spaced and extend normal to the shaft.

4. The system of claim 1 wherein the crimping bars are non-linear.

5. The system of claim 1 wherein the second crop roller is in tandem with the first crop roller.

6. The system of claim 1 further comprising a tool bar for connecting the system to a motive means.

7. The system of claim 1 wherein the compression frame further comprises a mechanical means of applying the downwardly force.

8. The system of claim 7 wherein the mechanical means further comprises an adjustment mechanism so that an operator can vary an amount of the downwardly force applied.

9. The system of claim 7 wherein the mechanical means is a shock absorber.

10. The system of claim 9 wherein the shock absorber comprises a compression spring.

11. The system of claim 1 wherein the main frame assembly comprises two opposing first end plates and two opposing second end plates, a lower end of the first end plates connecting the main frame assembly with the first crop roller frame assembly, a lower end of the second end plates connecting the main frame assembly with a pivot joint between the first crop roller frame assembly and the second crop roller frame assembly.

12. The system of claim 11 wherein the pivot joint comprises an isolator disposed between the first and second crop roller frame assemblies.

13. The system of claim 12 wherein the isolator is comprised of a resilient material.

14. The system of claim 13 wherein the isolator is rubber.

15. A conservation tillage system method of terminating cover crops comprising the steps of:

providing a main frame assembly;

connecting a first crop roller frame to the main frame assembly and installing a first crop roller in the first crop roller frame;

providing a second crop roller frame and installing a second crop roller in the second crop roller frame; the second crop roller comprising a central cylindrical drum with a plurality of crimping bars extending outwardly from the drum;

attaching the main frame assembly to a pivot joint between the first crop roller frame and the second crop roller frame;

extending a compression frame between the main frame assembly and the second crop roller frame;

placing a compression means on the compression frame so that the compression means provides a downwardly force on the second crop roller via the second crop roller frame;

propelling the first and second crop rollers across a field of crops so that the first and second crop rollers roll over the crops and thereby terminate the crops.

16. The method of claim 15 further comprising the step of:

installing a vibration isolator at the pivot joint between the first and the second crop roller frames.

17. The method of claim 16 wherein, in the placing step, the compression means comprises a shock absorber.

18. The method of claim 17 wherein the shock absorber comprises a coiled compression spring in combination with an adjustment mechanism.

19. The method of claim 15 wherein, in the propelling step, the first and second rollers are propelled by a tractor.

* * * * *